(12) United States Patent
Mao et al.

(10) Patent No.: US 8,800,146 B2
(45) Date of Patent: Aug. 12, 2014

(54) CONICAL SWIRLER FOR FUEL INJECTORS AND COMBUSTOR DOMES AND METHODS OF MANUFACTURING THE SAME

(75) Inventors: Chien-Pei Mao, Clive, IA (US); John Earl Short, Norwalk, IA (US)

(73) Assignee: Delavan Inc, West Des Moines, IA (US)

( * ) Notice: Subject to any disclaimer, the term of this patent is extended or adjusted under 35 U.S.C. 154(b) by 0 days.

(21) Appl. No.: 13/597,667

(22) Filed: Aug. 29, 2012

(65) Prior Publication Data
US 2013/0047620 A1     Feb. 28, 2013

Related U.S. Application Data

(62) Division of application No. 10/864,211, filed on Jun. 9, 2004, now Pat. No. 8,348,180.

(51) Int. Cl.
*B21K 25/00*     (2006.01)

(52) U.S. Cl.
USPC ..................................................... 29/889.22

(58) Field of Classification Search
CPC ....... B23P 15/006; F01D 9/042; F01D 9/044; F01D 25/285
USPC ......... 29/890.14, 889.22, 889.2; 60/746, 748, 60/755, 757; 239/403
See application file for complete search history.

(56) References Cited

U.S. PATENT DOCUMENTS

| | | | |
|---|---|---|---|
| 2,701,164 A | 2/1955 | Orent et al. | |
| 3,029,029 A | 4/1962 | Webster | |
| 3,638,865 A | 2/1972 | McEneny et al. | |
| 3,642,210 A | 2/1972 | Fluornoy et al. | |
| 3,790,086 A | 2/1974 | Masai | |
| 3,831,854 A | 8/1974 | Sato et al. | |
| 3,980,233 A | 9/1976 | Simmons et al. | |
| 4,559,009 A | 12/1985 | Marino et al. | |
| 4,754,922 A | 7/1988 | Halvorsen et al. | |
| 4,831,700 A | 5/1989 | Halvorsen et al. | |
| 4,842,197 A | 6/1989 | Simon et al. | |
| 5,094,610 A | 3/1992 | Mandai et al. | |
| 5,144,804 A | 9/1992 | Koblish et al. | |
| 5,167,116 A | 12/1992 | Koblish et al. | |
| 5,228,624 A | 7/1993 | Mensink | |
| 5,299,909 A | 4/1994 | Wulf | |
| 5,427,314 A | 6/1995 | Hagar | |
| 5,499,768 A | 3/1996 | Tanaka et al. | |

(Continued)

OTHER PUBLICATIONS

European Search Report dated Feb. 5, 2014 issued on corresponding European Patent Application No. 05006417.9.

*Primary Examiner* — Ryan J Walters
(74) *Attorney, Agent, or Firm* — Edwards Wildman Palmer LLP; Scott D. Wofsy; Joshua L. Jones

(57) ABSTRACT

A method of manufacturing gas and/or fuel swirlers for fuel injectors and combustor domes and cone-shaped swirlers so manufactured are disclosed. The disclosed conical swirlers feature cut-through slots on a cone-shaped body. The contour and spacing of the slots are configured and arranged to accommodate a wide range of requirements for fluid flow areas and swirl strengths. Preferably, the cone-shaped swirlers can be manufactured by wire EDM processing. More preferably, multiple cone-shaped swirlers can be manufactured simultaneously by nesting wirier blanks in a stack and wire EDM processing the stack as a unit. The cone-shaped pinwheel swirler fits well into various fuel injector heads, enabling the injectors to reduce the frontal surface area and flat area for minimal potential of carbon formation.

8 Claims, 7 Drawing Sheets

(56) References Cited

U.S. PATENT DOCUMENTS

| | | | |
|---|---|---|---|
| 5,505,045 A | 4/1996 | Lee et al. | |
| 5,605,287 A | 2/1997 | Mains | |
| 5,680,766 A * | 10/1997 | Joshi et al. | 60/746 |
| 5,761,907 A | 6/1998 | Pelletier et al. | |
| 5,797,268 A * | 8/1998 | Ryan | 60/748 |
| 5,823,764 A | 10/1998 | Alberti et al. | |
| 5,865,024 A | 2/1999 | Kress et al. | |
| 6,205,763 B1 | 3/2001 | Farmer et al. | |
| 6,224,816 B1 | 5/2001 | Hull et al. | |
| 6,256,995 B1 | 7/2001 | Sampath et al. | |
| 6,289,677 B1 | 9/2001 | Prociw et al. | |
| 6,363,726 B1 | 4/2002 | Durbin et al. | |
| 6,418,726 B1 | 7/2002 | Foust et al. | |
| 6,474,569 B1 | 11/2002 | Brundish et al. | |
| 6,484,489 B1 | 11/2002 | Foust et al. | |
| 6,539,724 B2 | 4/2003 | Cornwell et al. | |
| 6,547,163 B1 | 4/2003 | Mansour et al. | |
| 6,560,964 B2 | 5/2003 | Steinhorsson et al. | |
| 6,688,534 B2 | 2/2004 | Bretz | |
| 6,755,024 B1 | 6/2004 | Mao et al. | |
| 6,799,427 B2 | 10/2004 | Calvez et al. | |
| 6,865,889 B2 | 3/2005 | Mancini et al. | |
| 7,237,730 B2 | 7/2007 | Prociw et al. | |
| 8,348,180 B2 * | 1/2013 | Mao et al. | 239/403 |
| 2003/0110776 A1 | 6/2003 | Teets | |
| 2004/0040310 A1 | 3/2004 | Prociw et al. | |
| 2004/0061001 A1 | 4/2004 | Mao et al. | |
| 2005/0241319 A1 | 11/2005 | Graves et al. | |

\* cited by examiner

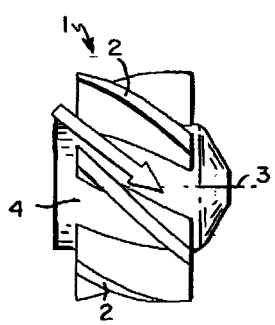
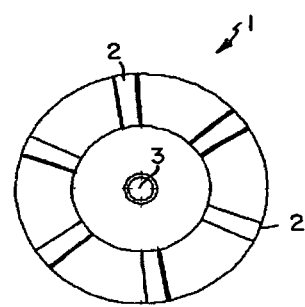
FIG. 1A PRIOR ART  FIG. 1B PRIOR ART
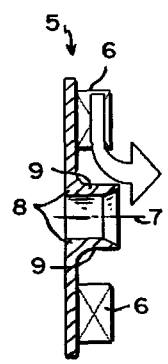
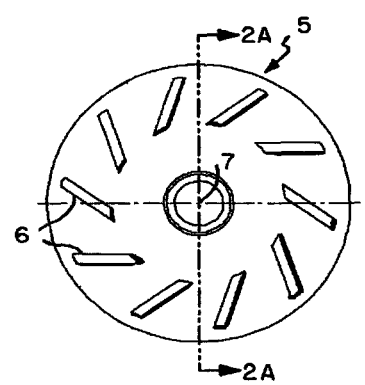
FIG. 2A PRIOR ART  FIG. 2B PRIOR ART

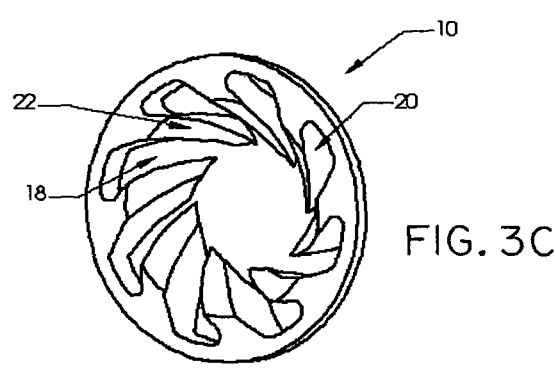
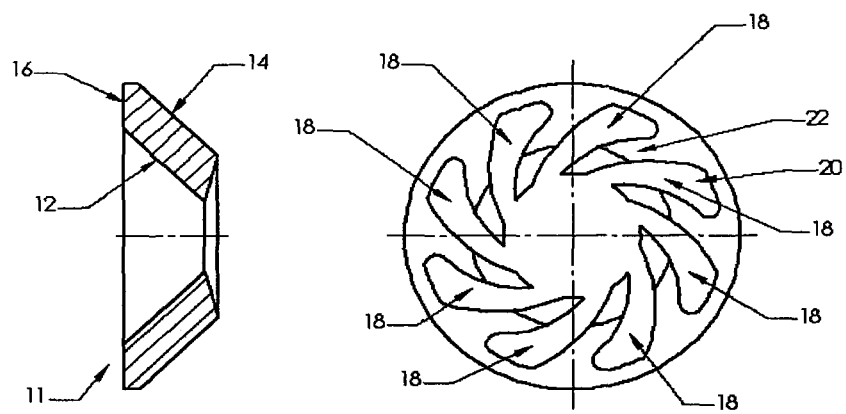
FIG. 3C
FIG. 3B  FIG. 3A

CONICAL SWIRLER FOR FUEL INJECTORS AND COMBUSTOR DOMES AND METHODS OF MANUFACTURING THE SAME

CROSS-REFERENCE TO RELATED APPLICATIONS

This application is a divisional of U.S. patent application Ser. No. 10/864,211 filed Jun. 9, 2004, now U.S. Pat. No. 8,348,108 which is incorporated by reference herein in its entirety.

BACKGROUND OF THE INVENTION

1. Field of the Invention

The present invention relates to fuel injection devices for mixing fuel and compressed air, and more particularly, to fuel injection devices for gas turbine engines that include a conical swirler to impart a swirling motion to dispensed fuel for improved fuel atomization and combustion and to methods of manufacturing such devices.

2. Background of the Related Art

Most fuel injectors, for example, most fuel injectors for gas turbine engines, enhance fuel atomization during engine ignition and combustion sequences using kinetic energy of a flowing air or gas stream to shatter a fuel sheet into fine droplets, which are then introduced into a combustion chamber. Atomization of fuel is desirable because atomized fuel combusts more quickly, more completely, and more cleanly. Some fuel injectors employ air assist atomizers to deliver high pressure, high velocity air from an external source, which is then mixed with fuel. An example of an air assist fuel nozzle is disclosed in commonly assigned U.S. Pat. No. 6,688,534, the teachings of which are incorporated herein by reference.

Typically, with air assist atomizers, fuel and externally supplied air that is delivered at high pressure and high velocity are mixed internally, i.e., within the nozzle, before the fuel-air mixture is discharged through a discharge orifice into a combustion chamber. In practice, it is desirable to maintain the air flow rate at a minimum, therefore, air assist atomizers are characterized by providing a relatively small quantity of very high velocity, high pressure air. One prevalent disadvantage of air assist atomizers, however, are undesirable backpressures within the nozzle that result from internal mixing in the nozzle.

An alternative to air assist atomizers are airblast atomizers, including for example, pre-filming type airblast atomizers and cross-flow type airblast atomizers. An example of a cross-flow type airblast atomizer is disclosed in commonly assigned U.S. Pat. No. 6,539,724, the teachings of which are incorporated herein by reference.

Whether the fuel injector is of an air assist or an airblast type, air swirlers are an essential component used in fuel injectors and combustor domes to produce a swirling flow in the primary combustion zone for sustaining and stabilizing the combustion process of the fuel over a wide range of operating conditions in gas turbine combustors. In a conventional combustor of a combustion chamber, the swirling flow is primarily established by a combined use of airflow entering through the combustor dome, fuel injector, and the dilution air holes on the liner walls of the combustor. The swirling flow creates a central recirculation zone that draws a portion of the hot combustion gases produced in the combustion chamber back toward the incoming cold fuel-air mixture to assist fuel vaporization and mixing. As the engine speed increases, the hot recirculation gas is capable of sustaining the combusting spray at a wide range of stochiometric ratios without blowing out.

However, due to the need to reduce pollutants and control emissions in general, advanced combustor design allocates a large portion of the combustor airflow through the fuel injectors and dome swirlers to lower the flame temperature in the primary combustion zone. This design approach has further enhanced the influence of air swirlers in determining the performance of gas turbine engines.

To achieve high performance and to reduce emission of pollutants, air swirlers not only enhance fuel/air mixing and flow stabilization, but they also assist fuel atomization and droplet dispersion. Depending on the application, the geometry of the air swirlers can vary significantly ranging from axial and radial turning vanes to the use of angled-holes and airfoil-shaped turning vanes. Each swirler design includes specific features and advantages to meet the requirements of various combustor designs and applications.

Most conventional fuel injectors and dome swirlers utilize either axial swirler turning vanes (FIGS. 1A and 1B) or radial swirler turning vanes (see FIGS. 2A and 2B) to generate swirling flows. Referring to FIGS. 1A and 1B, there is shown an axial swirler 1 that comprises a plurality of turning vanes 2 that, typically, are cut by a milling machine in a straight or helical profile along the central axis 3 of the swirler 1. The turning vanes 2 are positioned at a radial locus and are equally spaced apart in the circumferential direction about the central axis 3 of the swirler body 4. The region between the turning vanes 2 and the inner/outer confining walls forms the passages of the airflow, which is shown by an arrow. The primary feature of the axial swirler 1 is that the airflow within the passages is forced to circle around the central axis 3 of the swirler body 4 in a spiral manner. As airflow emerges out of the passages and the retaining walls, it expands radially outward at an acute angle with respect to the central axis 3 of the swirler body 4.

Referring now to FIGS. 2A and 2B, there is shown a typically radial swirler 5. The vane geometry of the radial swirler 5 differs from that of the axial swirler 1 shown in FIGS. 1A and 1B. Specifically, the respective bases or base portions of the turning vanes 6 of radial swirler 5 are arranged on a vertical plane that is normal to the central axis 7 of the swirler body 8. This configuration forces the airflow (as shown by the arrow) to move within the passages and retaining walls radially inward towards the central axis 7 of the swirler body 8. Using the radial swirler vanes 6, a deflecting flow or passage wall 9 is usually required to turn the airflow in the axial direction.

Others have disclosed alternative solutions. For example, U.S. Pat. No. 4,842,197 to Simon, et al. discloses a fuel injection apparatus and associated method for providing a highly atomized fuel flow using a swirl-induced recirculation flow in the combustion chamber. The Simon, et al. apparatus comprises three concentric air streams. The innermost and outermost air streams impart circumferential swirls in opposite directions. The central air stream is free of swirl, imparting a stream of air radially inward that is deflected in an axial direction. The innermost air stream and the central air stream atomize the fuel. The outermost air stream forms a stable recirculation region.

Additionally, U.S. Pat. No. 5,144,804 to Koblish, et al. discloses an airblast fuel nozzle to improve cold ignition. The Koblish, et al. fuel nozzle includes an inner air swirl system comprising air inlet slots spaced circumferentially about the nozzle body. Further, the air inlet slots include inner and outer tapered sections that provide an effective air swirl system.

Although both types of prior art air swirlers 1 and 5 demonstrate satisfactory results, axial swirlers 1 appear to be more widely used in fuel injectors. Axial swirlers 1 can be easily incorporated into common fuel injector devices, such as simplex airblast, pure airblast, and piloted airblast nozzles. They also are well suited for use in very small air passages to induce fluid swirl motion. The upstream opening of the turning vanes 2 in the axial swirler 1 is usually aligned with the incoming airflow, and, therefore, it does not encounter as much pressure loss from channeling the airflow into the vane passages as the radial swirler 5.

On the other hand, the radial swirlers 5 can be very effective in generating swirl flows without using aerodynamic turning vanes 6 with complex geometry. Radial swirlers 5 are largely used in the combustor dome. Using the simple straight vane geometry, a radial swirler 5 is capable of creating strong swirl and thorough mixing with little concern of the problem of aerodynamic wake flows.

A major disadvantage of axial and radial swirlers of the prior art is the means or method by which they are manufactured. Typically, axial and radial swirlers are manufactured by CNC milling machines. The machining process involves removing material one pass at a time along a certain trajectory or profile in a slow turning or profiling mode. This process is extremely time consuming. Further, when high-temperature hardened. materials are required for the swirlers, the milling process becomes even more time-consuming and the tooling cost usually increases significantly due to more frequent changes of the cutting tools. To become competitive in today's world market, manufacturers must develop new machining techniques and swirler designs to reduce the manufacturing costs of fuel injectors and combustion domes.

Therefore, it would be desirable to provide a novel method of designing and fabricating air swirlers for use in fuel injectors and combustor domes. Furthermore, it would be desirable to provide novel swirler configurations that permit use of a more accurate and efficient technique to fabricate multiple parts simultaneously in multiple stacks, promising a significant reduction of manufacturing cost. Finally, it would be desirable to provide fuel injector designs that incorporate the concept of cone-shaped swirlers for improved fuel atomization and combustion performance.

SUMMARY OF INVENTION

The present invention is related to a new conical swirler for fuel injectors and combustor domes used in gas turbine engines to impart swirling motion to fuel and air and methods of manufacturing such devices. Unlike conventional axial and radial swirlers, the disclosed conical swirler features a plurality of cut-through slots on a cone-shaped body. The contour and spacing of the slots can be configured and arranged in many different ways to accommodate a wide range of requirements for fluid flow areas and swirl strengths. The cone-shaped swirler of the subject invention fits well into various types of fuel injector nozzles and provides a reduced frontal surface area to minimize area for carbon formation. It is an object of the present invention to provide a fluid swirler that comprises a cone-shaped body portion and multiple contoured turning slots, wherein the contoured turning slots define a turning passage for providing a directed fuel or gas stream. Preferably, the fluid swirler is manufactured by the process described below.

It is another object of the present invention to provide a method of manufacturing air swirlers that comprises the steps of providing swirler blanks; arranging the swirler blanks in a coaxial arrangement; and forming a slot pattern in each of the swirler blanks. Preferably, the swirler blanks are cone-shaped or disk-shaped. More preferably, the swirler blanks are nested in a stack so that the slot pattern can be formed on each of the swirler blanks in the nested stack simultaneously.

In one aspect of the present invention, the preferred method of forming the slot pattern on the swirler blanks is by wire Electro Discharge Machining (EDM) processing whereby material from the blanks is removed to form the slot pattern. This process presents significant cost improvements over prior manufacturing methods, and results in producing swirlers that perform well in fuel atomization and combustion for gas turbine engine applications.

It is another object of the present invention to provide simplex airblast, dual-orifice airblast, and/or pure airblast injectors with conical air and/or fuel swirlers that can be used as either to induce or impart a swirling motion to a liquid and/or air stream.

Accordingly, in one embodiment, the present invention provides a fuel injector that comprises a fuel input portion for delivering fuel for atomization; a fuel output portion to provide a fuel output spray for atomization; and cone-shaped swirlers to provide an atomizing fluid stream of compressed gas in proximity of the fuel output portion. According to this embodiment, the cone-shaped swirlers are structured and arrange to include multiple turning vanes that, between adjacent turning vanes, define multiple airflow passages that direct the fluid stream of compressed gas radially inwardly to promote swirling action and subsequent expansion of the fluid stream to atomize the fuel.

Preferably, the cone-shaped swirler is sandwiched between an air cap that has an opening with a necking area that is at least two times the inlet opening area of the outer coneshaped swirler and a heat shield. More preferably, the air cap is structured and arranged to provide a converging, radially inward portion upstream of the necking area and a diverging, radially outward portion downstream of the necking area.

In another embodiment, the present invention discloses a fuel injector that comprises multiple fuel output portions that provide multiple, substantially concentric fuel sprays for atomization; and a swirler portion that directs fluid streams of compressed gas at the substantially concentric fuel sprays for atomization.

In yet another embodiment, the present invention discloses a fuel injector that comprises a single fuel output portion that provides a fuel film at a pre-filming portion; and a swirler portion that provides fluid streams to atomize the fuel film. Preferably, the fuel output portion includes a cone-shaped fuel swirler to provide a cone-shaped fuel film. More preferably, the swirler portion includes a cone-shaped swirler that directs a fluid stream of the compressed gas, which begins substantially outside of the fuel film, radially inward towards the cone-shaped fuel film to promote swirling action and subsequent expansion of the fluid stream to atomize the fuel film.

In still another embodiment, the present invention discloses a fuel injector that comprises a single fuel output portion, having an annular passage and an annular pre-filming orifice, that is structured and arranged to provide a substantially cone-shaped fuel film; and a swirler portion having a first cone-shaped swirler in communication with an inner air passage that is structured and arranged inside of the single fuel output portion and a second cone-shaped swirler in communication with an outer air passage that is substantially concentric with the first cone-shaped swirler and that is structured and arranged outside of the single fuel output portion. Preferably, the first cone-shaped swirler introduces air streams substantially inside of the annular fuel-prefilming orifice and the second cone-shaped swirler introduces air streams that substantially surround the substantially cone-shaped fuel film.

Other objects and advantages of the present invention will be made apparent to those skilled in the art from the accompanying drawings and descriptions.

BRIEF DESCRIPTION OF THE DRAWINGS

For a fuller understanding of the nature and desired objects of the present invention, reference is made to the following detailed description taken in conjunction with the accompanying drawing figures wherein like reference characters and numerals denote corresponding parts throughout the several views and wherein:

FIGS. 1A and 1B, respectively, show a side elevation view and a front plan view of an axial swirler representative of the prior art;

FIGS. 2A and 2B, respectively, show a cross sectional view and a front plan view of a radial swirler representative of the prior art;

FIG. 3A shows a frontal plan view of a first illustrative embodiment of an axial-type conical swirler with aerodynamic turning slots in accordance with the present invention;

FIG. 3B shows a side cross section view of an illustrative embodiment of a conical swirler blank in accordance with the present invention;

FIG. 3C shows a perspective view of the first illustrative embodiments of an axial-type conical swirler with aerodynamic turning slots in accordance with the present invention;

DETAILED DESCRIPTION OF PREFERRED EMBODIMENTS

Figure 4:
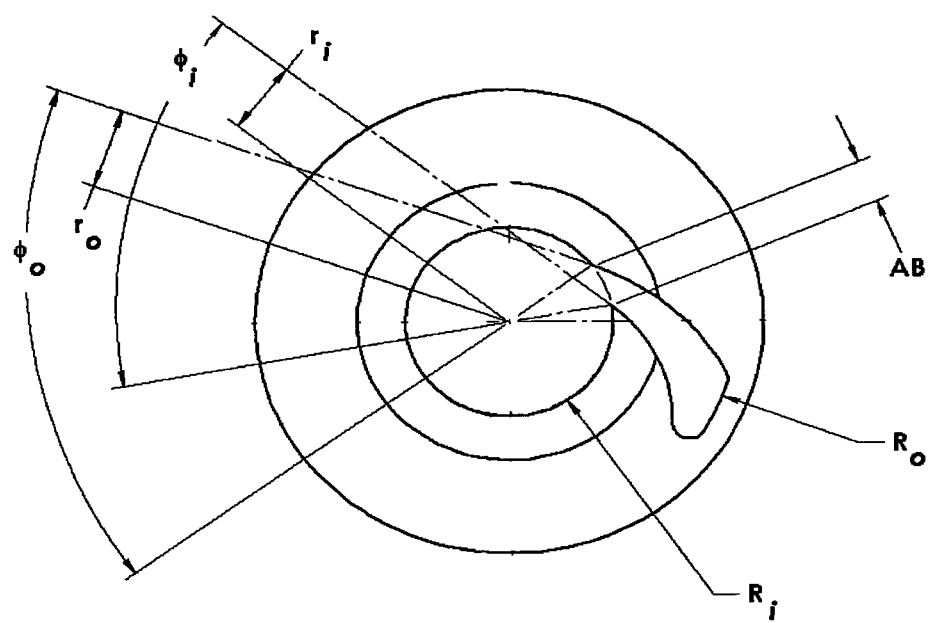
FIG. 4 shows the key design parameters for a typical conical pinwheel swirler.

Referring to FIGS. 3A and 3C, there is shown an illustrative embodiment of an axial-type, conical swirler 10 with aerodynamic turning slots 18 in accordance with a first embodiment of the present invention. Although the following description describes a conical or cone-shaped swirler, the invention is not to be limited thereto as the principles taught work also for disk-shaped and dome-shaped swirler blanks (not shown). The manufactured conical swirler 10 begins as a swirler blank 11 on which a specific slot pattern is formed. The slot pattern consists of a plurality of turning vanes 22 and a corresponding plurality of turning slots 18 that separates each pair of adjacent turning vanes 22. Although FIGS. 3A and 3C show eight turning vanes 22 and eight corresponding turning slots 18, the invention is not to be so limited as the swirler 10 can include fewer or more than eight slots 18 and vanes 22. FIGS. 3A and 3C also show that the dimensions of the slots 18 and the vanes 22 are generally of the same magnitude. The invention, however, is not to be so limited as, for example, the width of the turning vanes 22 could be two, three or more times as wide as the width of the turning slots 18 without deviating from the scope and spirit of this disclosure.

The dimensions of the swirler 10 must be compatible with the dimensions of the corresponding fuel injector or dome combustor for which they are manufactured. Typically, the length or thickness of a manufactured swirler 10 can range from about 0.200 inch to about 0.400 inch, the outer diameter of the swirler 10 can range from about 0.500 inch to about 1.500 inch, and the inner diameter radius of the swirler 10 can range from about 0.100 inch to about 0.800 inch.

Generally, when used with a fuel injector or dome combustor, the swirler 10 is disposed between an air cap and a heat shield. The swirler 10 should fit tightly between the air cap and the heat shield so that the walls of the turning vanes 22 and the inner surfaces of the air cap and the heat shield define the boundaries of an airflow channel through which compressed gas can travel and be subject to swirl.

The axial, conical swirler 10 shown in FIGS. 3A and 3C includes turning vanes 22 and turning slots that provide inner slot angles $\phi_i$ and outer slot angles $\phi_o$ that are acute angles, or less than 90 degrees. This configuration provides greater swirl strength and, moreover, directs the compressed gas radially inward towards the central axis of the conical swirler 10. When the radially-inward spiraling compressed gas reaches the downstream end of the swirler 10, the high turbulence gas wants to expand radially outward as it is encountering a fuel spray. The shear force breaks apart the liquid film into fine droplets and the outward expansion disperses the atomized droplets of fuel over a wider area. As a result, when the atomized droplets of fuel enter the combustion chamber (not shown) the resulting combustion can be quicker, more powerful and cleaner. This embodiment of the subject invention provides uniform fuel distribution, lower pressure drop across the nozzle and improved efficiency.

Figure 5C:
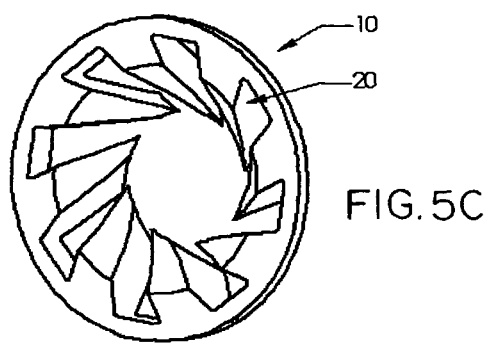
FIGS. 5A to 5C, respectively, show a frontal plan view, a cross section view, and a perspective view of a second illustrative embodiment of an axial-type conical swirler with straight-edged, aerodynamic turning slots in accordance with the present invention.
Figure 5B:
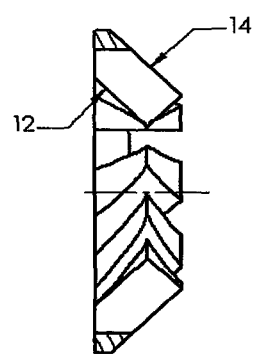
Figure 5A:
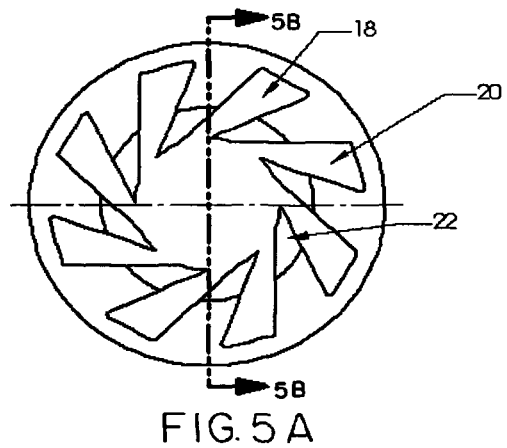

Referring now to FIGS. 5A to 5C, there is shown an alternate illustrative embodiment of an axial conical swirler 10 with straight-edged, aerodynamic turning slots 18 in accordance with the present invention. The conical swirler 10 in FIGS. 5A to 5C is substantially identical to the conical swirler 10 in FIGS. 3A and 3C except that the turning slots 18 are linear or substantially linear, rather than curved. This orientation is likely to produce less swirl strength than is the case with non-linear or curved turning slots 18. Because of the linear or straight slots, this embodiment of the swirler provides lower machining time, and more efficient design and manufacture, as compared to those with curved turning slots.

Figures 7A, 7B:
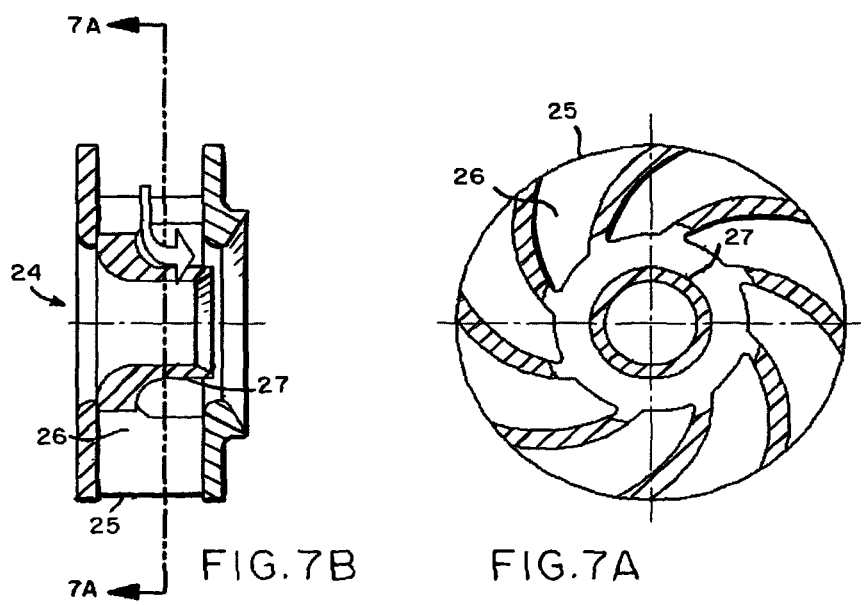
FIGS. 7A and 7B, respectively, show frontal plan view and a cross section view of an illustrative embodiment of a radial-type swirler made by the wire EDM process in accordance with the present invention.

Referring to FIGS. 7A and 7B, there is shown an illustrative embodiment of a radial-type conical swirler 24 in accordance with the present invention. Preferably, the configuration of the embodied radial swirler 24 can be used with a combustor dome to provide a significant reduction in manufacturing costs without compromising swirl performance. The embodied radial-type conical swirler 24 includes a plurality of intake openings 25 that are disposed on the outer perimeter of the swirler 24 rather than at the base of the axial conical swirlers 10 as previously described. Although FIGS. 7A and 7B show eight intake openings 25 and eight corresponding turning vanes, the invention is not to be so limited as the swirler 24 can include fewer or more than eight intake openings 25 and turning vanes.

The intake openings 25 shown illustratively provide a non-linear, or curved, airflow path through a corresponding plurality of turning passages 26. The invention, however, is not to be so limited as the intake openings 25 can also be linear without deviating from the scope and spirit of this disclosure. As the incoming airflow enters the intake openings 25 of the conical swirler 24 from a substantially radial direction, the airflow follows the orientation of the intake opening radially inward through the aerodynamic turning passages 26. Subsequently, the radial-inward moving airflow is turned, or deflected, towards an axial or substantially axial direction by a deflector wall 27.

Having described several embodiments of axial- and radial-type conical swirlers, preferred methods of manufacturing a plurality of conical air swirlers will now be described. Although throughout this discussion, the blanks will be referred to as "cone-shaped", the invention is not to be so limited as the air swirler blanks can also be disk-shaped or dome-shaped.

The first step in the manufacturing process is to provide a plurality of cone shape blanks 11 for further machining. A side elevation view of an illustrative embodiment of a cone shape swirler blank 11 is shown in FIG. 3B. The swirler blank 11 includes an interior surface 12 and an exterior surface 14. The interior and exterior surfaces 12 and 14 of the swirler blank 11 are not necessarily parallel to each other, but, preferably, provide a generally conical shape. A flat surface 16 on the swirler blank 11 is prepared for the upstream openings of the turning slots 18. Flat surface 16 generally is structured and oriented in a direction normal or substantially normal to the incoming fluid flows. However, in another aspect of the present invention, the flat surface could be structured and oriented with a slight inclination angle.

The second manufacturing step is to determine the two-dimensional slot pattern that is to be provided on the swirler blank 11. FIGS. 3A and 3C, respectively, provide frontal plan and perspective views of a slot pattern 18 that will be constructed on the swirler blank 11 to form the desired flow passages. The illustrative slot pattern 18 contains eight aerodynamic turning contours that closely resemble a pinwheel. Although, the illustrative slot pattern 18 includes eight slots and eight corresponding turning vanes, the number of slots 18 and turning vanes 22 can be more than or less than eight and the pattern can be varied.

The slot pattern 18 determines the performance of the conical swirler 10. Therefore, it is important that some of the key parameters be identified for design consideration. Referring to FIG. 4, important slot parameters include inner offset distance $r_i$, outer offset distance $r_o$, inner radius $R_i$, outer radius $R_o$, inner slot angle $\phi_i$, outer slot angle $\phi_o$, and throttle gap AB. Depending on the slot 18 contours and shapes, these parameters are interrelated and influence swirler performance to a different extent. For example, offset distance appears to have a strong effect on swirl strength of the fluid flow. Specifically, the higher the offset distance, the higher is the swirl strength. However, a smaller inner radius $R_i$ tends to reduce swirl strength and, moreover, provides a narrower spray angle. Contrary to what one would expect, a smaller throttling gap AB does not necessarily translate into smaller effective flow area for the swirler 10 because the contour shape and the swirl strength associated with the slots 18 also contribute to flow area. Generally, an aerodynamically shaped slot pattern 18 provides higher turning efficiency than a straight slot pattern 18.

Using the above guidelines and parameters, one skilled in the art can configure the two-dimensional cutting pattern in many different ways to meet a wide range of swirler and flow field requirements. For example, FIGS. 5A to 5C provide views of a second illustrative embodiment of a simple slot pattern 18 that employs turning vanes 22 with straight cutting edges. This straight-edged configuration is easy to manufacture and swirler performance is not compromised.

In a third step, once the slot pattern 18 is determined, material within the contoured slots 18 of the swirler blank 11 can be removed. The new conical swirlers 10 could be manufactured by a number of different machining techniques, including conventional CNC milling, casting, laser milling, photochemical etching, and any combination of these techniques. Preferably, material is removed from the swirler blank 11 using an EDM machine and EDM processing, which machines and processing techniques are well known to those skilled in the art.

Briefly, wire EDM processing utilizes sparks between an electrically conductive work piece, i.e., the swirler blank 11, and an electrode (not shown). A dielectric liquid, e.g., de-ionized water and oil, separates the work piece and the electrode and serves to flush away the resulting debris.

The sparks occur at a very high temperature, which melts and evaporates a tiny amount of the work piece. Using thin wire electrodes, the EDM process can provide high quality, high precision parts without the restrictions inherent to the other machining processes. In this manner, material can be remove to form inlet openings 20 and the curved turning vanes 22.

Wire EDM processing offers many distinct advantages for making the new conical swirlers 10. It is ideal to produce complex curved shapes, allowing the designers to configure the slot geometry in many different ways for various applications. Furthermore, it is capable of handling exotic materials, including heat-treated, hardened, and tough to machine stainless steels and alloys. The wire EDM process can easily hold down to ±0.001 inch tolerances and tighter. Usually the accuracy and consistency can be maintained on each swirler part, regardless of quantity. Further, unlike conventional milling methods, parts produced by wire EDM processing are burr free and can save a tremendous amount of labor cost. Because the process does not introduce any stress to the materials, the swirler parts do not warp, bow or curl after machining.

The most important feature of wire EDM processing, however, is that the conical swirlers blanks 11 can be stacked, or nested together, to allow the fabrication of many precision parts simultaneously. The combined use of stacked swirlers 10 and automated computer control makes wire EDM processing the most efficient and economical choice for making the conical swirlers 10 described in this invention.

Figure 6:
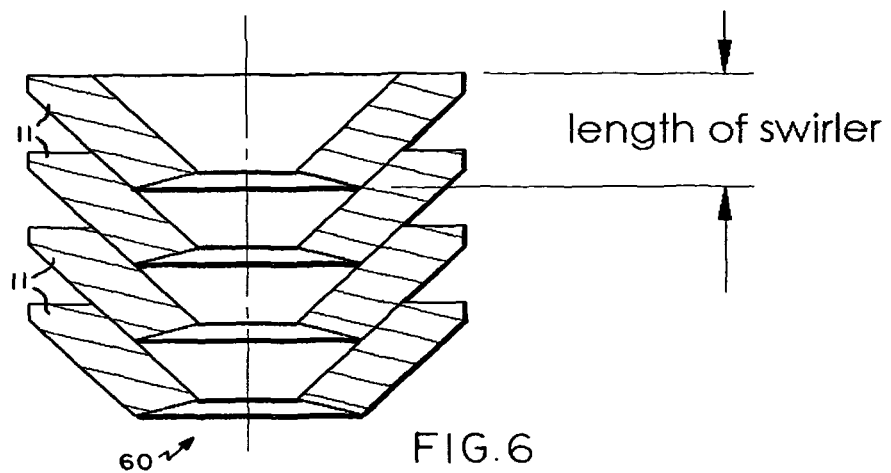
FIG. 6 shows an illustrative embodiment of nested swirler blanks prepared for simultaneous wire EDM machining.

Preferably, prior to machining, a plurality of swirler blanks 11 can be nested in a stack 60 as shown in FIG. 6. The swirler blanks 11 are piled up on top of each other and are held together by a fixture (not shown) during wire EDM processing. The number of swirler blanks 11 that can be fabricated simultaneously depends on the length of the individual swirler blanks 11. In a preferred embodiment, for efficient, high-speed wire EDM processing, the total length of the stacked swirler blanks 11 should not exceed about two (2) inches. The length of a typical swirler blank 11 can range from about 0.200 inch to about 0.400 inch. Accordingly, for swirler blanks 11 having a length of about 0.200 inch, each wire EDM manufacturing operation can produce at a minimum, at least ten (10) finished conical swirlers 10 simultaneously in one stack 60.

Those skilled in the art will readily appreciate that the number of swirler blanks that can be machined at one time will depend largely upon the capacity of the EDM machine. In addition, the number of conical swirlers that can be stacked together and machined at one time will depend upon the conical pitch of the blanks, which will define the extent to which the stacked conical swirlers overlap one another.

Most importantly, due to wire EDM processing, each of the finished conical swirlers 10 from the stack 60 will have precisely the same dimensions with consistent performance. Precise and consistent dimensions are extremely important in cost reduction because they eliminate many subsequent operations such as de-burring, rework, inspection, and calibration.

Although the wire EDM manufacturing method is ideal for manufacturing conical style swirlers 10, it is also suited to manufacture disk-shaped, radial swirlers 24.

Use of a conical swirler 10 in a fuel injector will now be described. One of the main purposes in developing conical swirlers 10 is to integrate them into the fuel injectors for cost reduction. Cone-shaped swirlers 10 not only allow use of wire EDM processing to reduce manufacturing costs, but also fit well into most existing injector configurations that contain conical surfaces. In operation, when a conical swirler 10 is used as an air swirler for a fuel injector, compressed air enters the turning slots at the openings 20. The airflow under pressure is forced into the turning passages defined by the sidewall of the turning vanes 22 and the retaining wall on the interior surface 12 and the exterior surface 14. The swirl strength of the airflow is largely determined by the offset distance and angle of the turning slots at the exit area.

Figure 8:
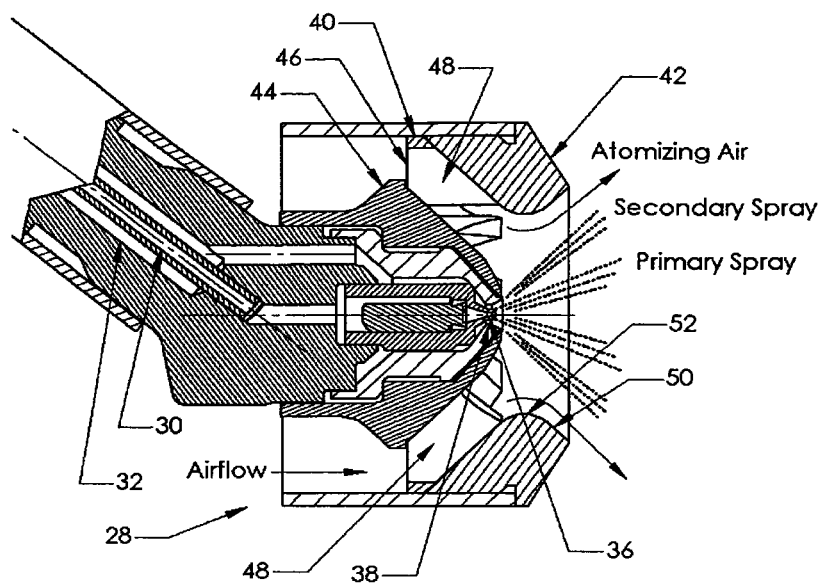
FIG. 8 shows a cross section view of a dual-orifice airblast injector, including a preferred embodiment of a conical, axial-type air swirler.

FIG. 8 shows an illustrative embodiment of a conical air swirler 40 that is fitted into a dual-orifice airblast injector 28. The embodied dual-orifice airblast injector 28 includes two fuel circuits: a primary fuel circuit 30 and a secondary fuel circuit 32. Fuel traveling through the primary fuel circuit 30 exits from orifice 36 and produces a primary spray. Similarly, fuel traveling through the secondary fuel circuit 32 exits from an annular orifice 38 to form a concentric secondary spray. Each of the fuel circuits can accommodate similar or different fluids. Accommodation of different fluids enables spray characteristics of the fuel injector 28 to be altered for different engine applications and air-fuel mixtures.

Preferably, the conical air swirler 40 can be positioned between an air cap 42 and a heat shield 44. The atomizing airflow enters into the air swirler 40 at opening 46 and travels through the turning passages defined by the turning vanes 48 toward the center axis. As the airflow emerges from the injector 28, it expands radially outward to disperse the fuel droplets from the primary and secondary sprays into a circular or substantially circular pattern.

Through experimental tests, performance of the conical swirler 40 in the embodied airblast fuel injector 28 is strongly coupled with the geometry of the air cap 42. More specifically, the contoured shape of the exit surface 50 and the dimension of the diameter of the necking point 52 play an important role in determining the spray characteristics, such as, droplet size, spray angle, swirl strength, flow velocity and spray patterns.

The preferred contoured shape of the exit surface 50 of the air cap 42 is a smooth, convergent-divergent geometry with a necking point 52 located a short distance from the fuel exit orifice 36. "Convergent-divergent geometry" refers to a geometry that, upstream of the necking point 52, converges radially inwardly in the direction of the conical swirler 40 and, downstream of the necking point 52, diverges radially outwardly towards the combustion chamber (not shown).

Swirling air from the conical swirler 40 after it exits the airflow passages first enters the converging, radially inward portion of the air cap 42. As a result, the exiting airflow is directed towards the orifice 36 and annular orifice 38, which promotes greater swirl and better atomization. Then, when the atomized fuel passes through the necking point 52 into the diverging, radially outward portion of the air cap 42, the atomized fuel is dispersed radially outward as it enters the combustion chamber.

Preferably, the diameter of the necking point 52 must provide a large enough exit area so that it does not impose additional constriction to the airflow entering into the swirler passages. Generally, the preferred flow area at the necking point 52 should be at least two times that of the available swirler inlet opening area 46.

Figure 9:
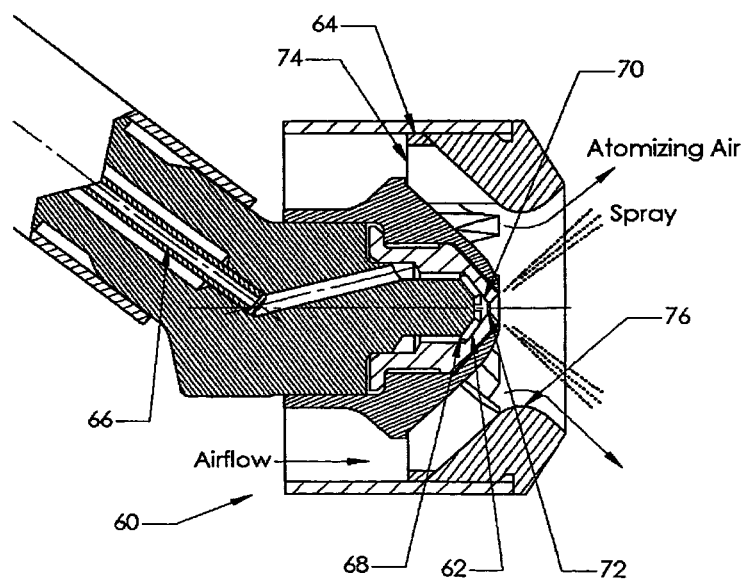
FIG. 9 shows a cross section view of a simplex airblast injector, including a preferred embodiment of conical, axial-type air and fuel swirlers.

FIG. 9 shows an illustrative embodiment of plural conical swirlers 62 and 64 that are fitted into a single-circuit simplex airblast injector 60. In this illustrative embodiment, the fuel injector 60 includes a conical swirler 64 for an air flow circuit and a conical swirler 62 for a fuel flow circuit. The single-circuit, simplex airblast injector 60 utilizes a conical fuel swirler 62 and a conical air swirler 64 to induce swirl motion for fuel atomization and droplet dispersion.

Liquid fuel under pressure is forced through the fuel circuit 66 into the opening 68 of the fuel swirler 62. The liquid fuel emerges from the turning passages of the fuel swirler 62, generating a whirling flow of fuel in the swirl chamber 70. The whirling liquid fuel exits the orifice 72 of the swirl chamber 70 as a hollow spray that contains a multitude of fine fuel droplets.

On the airflow side, compressed air enters the openings 74 of the air swirler 64. The turning vanes direct the airflow radially inward. As the airflow exits the airflow passages of the air swirler 64, the airflow first enters the converging, radially inward portion of the air cap. As a result, the exiting airflow is directed towards the fuel spray exiting the orifice 72, which promotes greater swirl and better atomization. Rapid mixing and atomization of the fuel spray and swirling air take place in the vicinity of the necking area 76 before the atomized spray diverges radially outward into the combustion zone.

Figure 10:
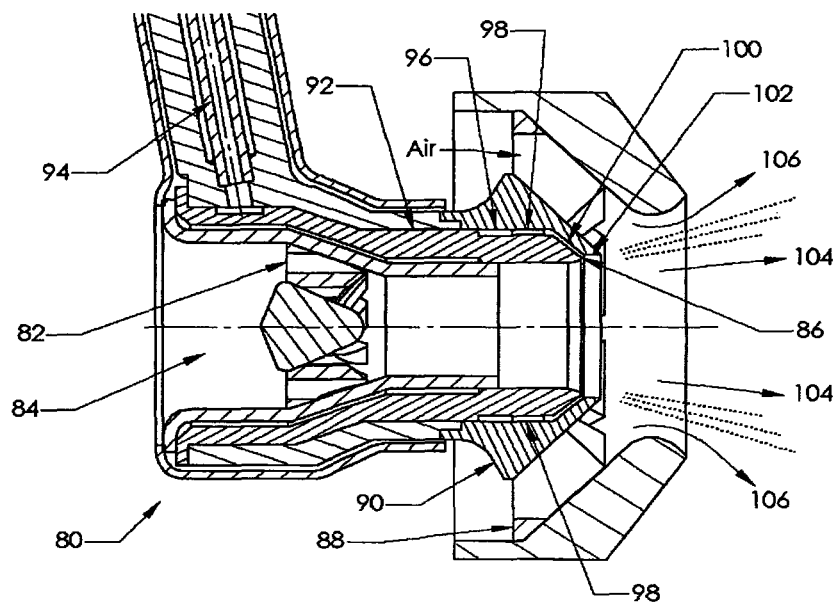
FIG. 10 shows a cross section view of a pre-filming pure airblast injector, including a preferred embodiment of two, coaxial, conical, axial-type air swirlers.

FIG. 10 shows yet another illustrative embodiment of plural conical air swirlers 82 and 88 that are fitted in a pre-filming airblast injector 80. In this particular configuration, an inner air swirler 82 is located in the central passage 84 of the fuel injector 80 at some distance upstream of an annular fuel orifice 86. An outer air swirler 88 is disposed between the air cap and the outside of a heat shield body 90. Preferably, the inner and outer air swirlers 82 and 88 are coaxial.

The fuel swirler 92 is connected to a fuel delivery line 94. Fuel passes through the fuel delivery line 94 to the fuel swirler 92 where it travels through a winding, spiral passage 96 to a plurality of spin slots 98. Fuel passes through the spin slots 98 into an annular fuel gallery 100. From the annular fuel gallery 100, the fuel enters a pre-filming area 102, where, at first, it attaches to the wall surface of the pre-filming area 102 before it is released into the converging, radially-inward portion of the air cap in the form of a hollow sheet.

A compressed gas enters the openings of the outer air swirler 88 and, further, passes through a central passage 84 before entering the openings of the inner air swirler 82. Each of the outer and inner air swirlers 88 and 82 include turning vanes that direct the airflow radially inward towards a center axis about which the air swirlers 82 and 88 are coaxially structured and arranged. The inner air swirler 82 produces an inner air stream 104 that enters the converging, radially inward portion of the air cap inside the hollow sheet of fuel.

The outer air swirler 88 produces an outer air stream 106 that enters the converging, radially inward portion of the air cap outside the hollow sheet of fuel. The combined airflow of the inner air stream 104 and the outer air stream 106 attacks the hollow sheet of fuel to cause sheet breakup, which disperse the droplets into the desired spray pattern. The atomized spray passes into the diverging, radially outward portion of the air cap, causing the atomized spray to diverge radially outward into the combustion zone.

Although preferred embodiments of the invention have been described using specific terms, such description is for illustrative purposes only, and it is to be understood that changes and variations may be made without departing from the spirit or scope of the following claims.

What is claimed is:

1. A method of manufacturing air swirlers, the method comprising the steps of:
   a) providing a plurality of swirler blanks;
   b) arranging said plurality of swirler blanks in a coaxial manner;
   c) nesting and security said plurality of swirler blanks in a stack together; and
   d) forming a slot pattern by machining through each of said plurality of swirler blanks simultaneously.

2. The method as recited in claim 1, wherein the step of providing a plurality of swirler blanks includes providing a plurality of cone-shaped swirler blanks.

3. The method as recited in claim 1, wherein the step of providing a plurality of swirler blanks includes providing a plurality of disk-shaped swirler blanks.

4. The method as recited in claim 1, wherein the step of machining the slot pattern through each of said plurality of swirler blanks further comprises the step of feeding said plurality of swirler blanks into a wire Electro Discharge Machining (EDM) machine.

5. The method as recited in claim 4, wherein the step of machining the slot pattern in each of said plurality of swirler blanks further comprises the step of removing material of each of said plurality of swirler blanks using the wire EDM machine to form the slot pattern.

6. The method as recited in claim 5, wherein the step of removing material of each of said plurality of swirler blanks includes providing a computer controlled system to form various patterns of turning slots or passages on each of said plurality of swirler blanks.

7. The method as recited in claim 4, wherein the step of feeding said plurality of swirler blanks is performed manually.

8. The method as recited in claim 4, wherein the step of feeding said plurality of swirler blanks is performed using an automated robotic arm.

* * * * *